United States Patent [19]

Trema

[11] Patent Number: 4,756,547
[45] Date of Patent: Jul. 12, 1988

[54] SUSPENSION AND STEERING CONTROL DEVICE FOR MOTORCYCLE

[75] Inventor: Daniel Trema, Bezons, France

[73] Assignee: Elf France, Courbevoie, France

[21] Appl. No.: 17,887

[22] Filed: Feb. 20, 1987

[30] Foreign Application Priority Data

Feb. 21, 1986 [FR] France ............... 86 02394
Jul. 17, 1986 [FR] France ............... 86 10403

[51] Int. Cl.⁴ .................. B62K 25/04; B62K 21/02
[52] U.S. Cl. ..................... 280/668; 180/219; 280/276; 280/724
[58] Field of Search ............. 280/276, 277, 771, 724, 280/668; 180/219

[56] References Cited

U.S. PATENT DOCUMENTS

| | | | |
|---|---|---|---|
| 2,233,313 | 2/1941 | Hazelroth | 280/276 |
| 2,756,070 | 7/1956 | Torre | 280/276 |
| 4,179,135 | 12/1979 | Slater | 280/276 |
| 4,364,447 | 12/1982 | Yoshida | 280/668 |
| 4,526,249 | 7/1985 | Parker | 180/219 |

Primary Examiner—Kenneth R. Rice
Attorney, Agent, or Firm—Burgess, Ryan & Wayne

[57] ABSTRACT

Suspension and steering device for a motorcycle front wheel carried by at least one support arm connected at its upper end to a suspension and shock absorber block wherein a handlebar or wheel is rotatively mounted on a vertical axis of a peak and is rotationally mounted around an axis at the upper end of an upper link inclined towards the front and the lower end of which is rotationally mounted about an axis at the upper end of a lower link inclined towards the front of the motorcycle from its lower end and which is rotationally connected to an axis whereby the handlebar is rotationally connected to the support arm, wherein the device being applicable to a motorcycle wheel steering assembly including a single lateral support arm for the wheel axle.

11 Claims, 2 Drawing Sheets

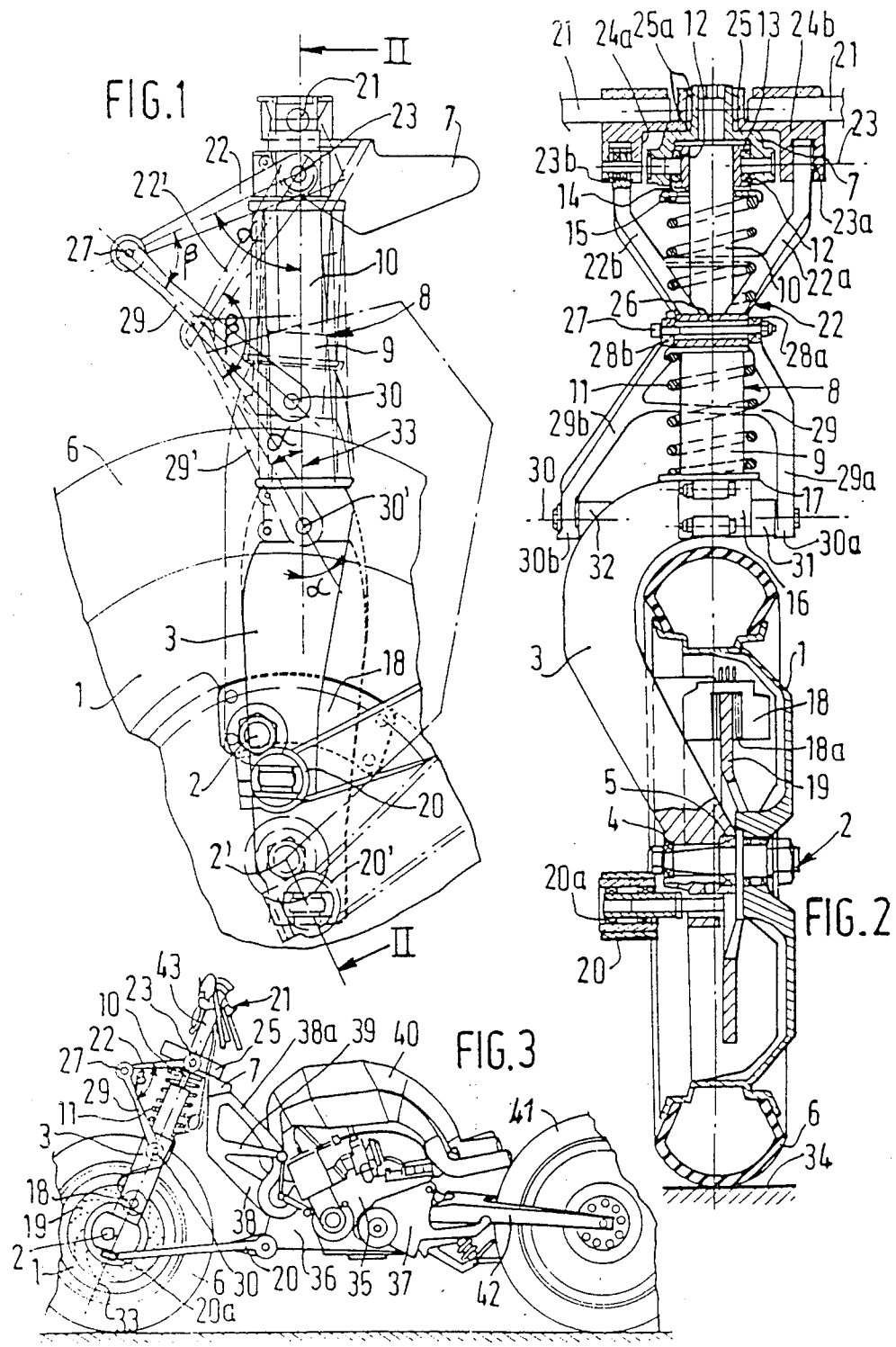

SUSPENSION AND STEERING CONTROL DEVICE FOR MOTORCYCLE

BACKGROUND OF THE INVENTION

Field of the Invention

The present invention applies to a device comprising a lateral front suspension arm for supporting and steering a wheel and to a steering control device associated thereto, especially for a motorcycle front wheel carried by at least one support arm connected at its upper end to a suspension and/or shock-absorbing block the external movable rod of which is articulated at its end on a front peak of the chassis of a motorcycle.

It has already been proposed to produce a motorcycle front suspension comprising a single support arm of the front wheel which is mounted cantilevered on this arm and wherein a suspension spring is interposed between a front peak of the motorcycle chassis and the support arm by means of a movable rod of a suspension arm which is pivotally mounted on this peak. These motorcycle suspensions of the Mac Pherson type give rise to a problem regarding the connection between the steering handlebar and the single support arm of the front wheel.

In order to ensure the connection between the single support arm and the handlebar, it has been proposed to use a universal joint transmission by links that has revealed relatively expensive and complicated to manufacture, while nevertheless transmitting to the handlebar the sudden reactions due to the displacements of the suspension. Another solution consists in interlocking at least for translational motion the end of the movable rod to the handlebar and in interlocking for rotational motion through a sliding connection this rod to the telescopic suspension block body, this body being rigidly fixed to the single suspension arm. This apparently satisfactory solution has revealed in practice to be very difficult to carry out since there exists no telescopic suspension and shock-absorbing block the rod of which is interlocked in rotational motion with the block body; indeed, such an arrangement would require a sleeve integral with the rod and surrounds the block body while being coupled thereto for rotational motion by grooves, so as not to disturb the hydraulic liquid sealing means of the shock absorber.

One particular object of the present invention is to propose a device comprising a single lateral suspension arm and steering control means adapted to this Mac Pherson type suspension, which are a simple in design, do not transmit stray reactions to the handlebar while allowing to use for the constructing suspension and shock-absorbing block commercially available elements of which the reliability and economy are well established.

With this purpose in view, the suspension spring and/or shock absorbing block is a helical spring of which at least one of the end bearing planes comprises a low friction abutment allowing the spring to rotate freely about its longitudinal axis during its displacements and the steering control means is constituted by a handlebar or wheel rotatively mounted on a vertical axis of the said peak rotatively mounted on an axis substantially perpendicular to the median plane of the front wheel, i.e. to the steering plane, at the upper end of at least one upper link inclined towards the front of the motorcycle from its upper end and the lower end of which is also mounted on the lateral arm or support arm for rotation about an axis substantially perpendicular to the said steering plane at the upper end of at least one lower link inclined towards the front of the motorcycle from its lower end which is rotationally connected to an axis substantially perpendicular to the said steering plane, so that the upper and lower links connected in rotation respectively to the handlebar and to the support arm are pivotally interconnected in a scissor-like manner during the displacements of the front wheel suspension of the motorcycle.

According to the most current embodiment, the upper link and the lower link present substantially the same length and their respective median lines each form, in maximal extension position of the suspension block, an angle of about 30° with the longitudinal axis of this suspension block.

The upper link and the lower link can present substantially different lengths and their respective median lines thus form, in maximal extension position of the suspension block, an angle smaller than 30° with the longitudinal axis of this suspension block. The upper link can also present a length substantially smaller than that of the lower link so as to increase the distance between the front wheel and the axis of articulation interconnecting between the two links. The axis of articulation of the upper link is preferably substantially coaxial to the axis of articulation of the external movable rod of the suspension and shock absorbing block on the front peak of the chassis of the motorcycle.

According to another very compact embodiment of the invention, the upper link presents, on its upper part, a fork with two legs, each of which is rotationally connected to a boss of an arm of the handlebar and has at its lower part, a single central bearing through which extends a pin or assembly shaft and which is disposed between two bearings that are also crossed through by the assembling pin and which are both provided at each of the ends of the legs of a fork of the lower link, two lower legs of which extend therefrom are rotationally connected each to a corresponding boss provided on the support arm. The corresponding upper and lower links present the general form of a trapezium the large base of which is articulated respectively to the handlebar and to the support arm of the front wheel, and the small bases of which are joined to each other in the zone crossed through by the assembly pin and are articulated or hinged to each other.

According to another embodiment of the invention, the rotation connection of the upper end of the upper link and that of the lower end of the lower link are located beyond the bearing planes of the ends of a helical spring constituting the suspension spring of the suspension block. The steering links thus constitute supplementary guiding means of the suspension block during its displacements.

According to a second embodiment, the present invention also relates to a control device for steering a wheel, especially a front wheel of a motorcycle, comprising a handlebar or steering wheel rotatively mounted upon an axle of a frame peak and upon which is mounted rotatively about an upper link substantially perpendicular to the median plane of the front wheel, the upper end of at least one downwardly inclined upper link the lower end of which is articulated to the upper end of at least one lower link upwardly inclined from its lower end which is rotatively mounted on a lower link axle integral with at least one wheel support arm and substantially perpendicular to the median plane of the front wheel, so that the upper and lower links rotatively connected to the handlebar and the support arm, respectively, are interconnected scissor-like to each other during displacement of the front suspension of the motorcycle.

It has already been proposed to connect the handlebar to the lateral arm through a set of links hingedly connected to one another in a scissorlike manner in order to absorb the displacement of the suspension and to transmit to the wheel support arm and to the wheel the torques exerted upon the handlebar. This solution has revealed satisfactory when the upper and lower axes of articulation of the respective upper and lower links substantially intersect the longitudinal axis of the suspension helical spring. On the contrary, when it has been envisaged to reduce the height requirement of this type of single arm suspension by shifting the axis of articulation of the suspension spring with respect to the axis of orientation of the support arm, and by shifting in a similar way the lower axis of articulation of the lower link, for example in order to house the steering articulation of a steering arm of the wheel support arm, jamming and "hard point" phenomena have appeared in the articulations of the links.

The aim of the present invention is to provide a steering control device that is adapted to this more compact type of suspension and steering control and which has a simple design and does not transmit interference reactions to the handlebar while yet limiting the displacement zone of the links and the volume of fairing that covers it.

With this purpose in view, the articulation between the lower end of the upper link and the upper end of the lower link is constituted by a ball-and-socket articulation adapted to absorb the relative decentering of the upper and lower link axes during the rotation of the handlebar.

According to another embodiment of the invention, the center line of the upper link substantially intersects the longitudinal axis of the helical suspension spring corresponding to the said wheel.

Due to the disposition of the links according to the invention, the lower link axle can be placed on the opposite side of the motorcycle frame, with respect to the orientation axis of the wheel support arm and to the longitudinal axis of the suspension spring and the lower articulation of a helical suspension spring corresponding to the wheel can be connected to the wheel support arm on the side of the motorcycle frame with respect to the orientation axis of the wheel support arm.

According to one embodiment of the invention, the center line of the upper link axis substantially intersects the longitudinal axis of the helical suspension spring associated to said wheel.

Due to the arrangement of the links in accordance with the invention it is possible to place the lower link axis on the opposite side of the motorcycle chassis with respect to the steering axis of the wheel support arm and the longitudinal axis of the suspension spring, and the lower articulation of a helical suspension spring associated to the wheel can be connected to do wheel support arm on the side of the motorcycle chassis with respect to the axis of orientation of the wheel support arm.

According to a further embodiment of the invention, the lower link is shorter than the upper link and is adapted to move towards a position substantially perpendicular to the axis of orientation of the wheel support arm under conditions of the maximum compression of the suspension of the wheel.

The upper part of the ball-and-socket articulation is advantageously constituted by a sphere-receiving carter secured to the lower end of the upper link, and its lower part is constituted by a ball bearing sphere adjustably secured to the upper end of the lower link.

BRIEF DESCRIPTION OF THE DRAWINGS

Other objects, advantages and features of the invention will appear from the following description of an embodiment of the invention, given by way of non-limitative illustration, with reference to the appended drawings in which:

FIG. 1 is a side view of the suspension and steering control device according to the invention represented in its two extreme positions, i.e. fully extended and fully compressed, respectively, a major portion of the wheel the motorcycle being torn away for enhanced clarity;

FIG. 2 is a cross-sectional view taken in plane II—II of FIG. 1, representing the steering control device as viewed towards the front, according to a cross-sectional plane passing through the articulation between the two links, and another cross-sectional plane passing through the wheel transversally via its axle and outside the brake disk yoke;

FIG. 3 is a side view, fairings removed, of a motorcycle utilizing a suspension and steering control device according to the invention, but slightly modified with respect to that of FIGS. 1 and 2.

DESCRIPTION OF THE PREFERRED EMBODIMENTS

Figure 4:
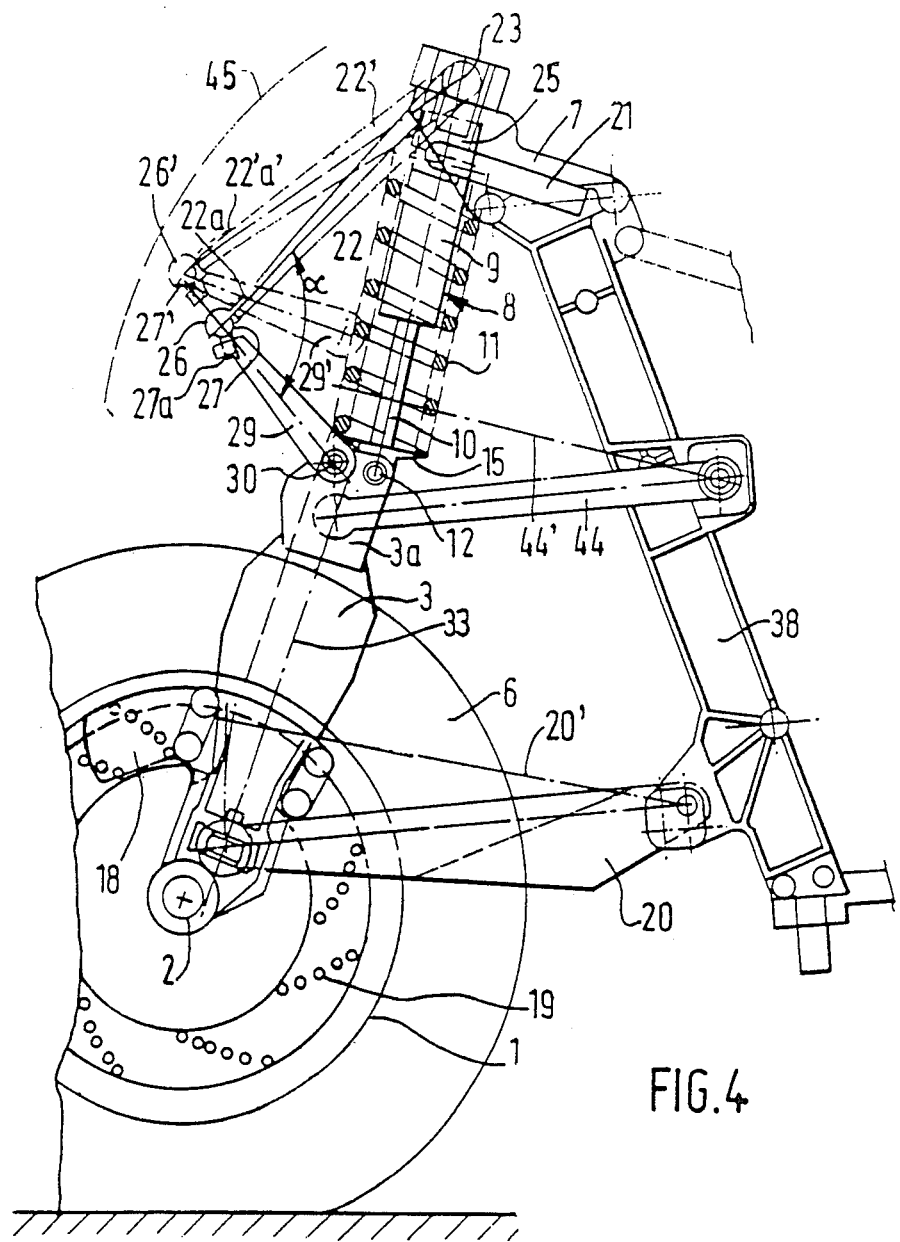
FIG. 4 is a schematic side view another embodiment of the steering control device according to the invention, connected, as shown, to the wheel support arm in its fully extended position, parts of the motorcycle wheel being torn away for enhanced simplicity of the drawing in which the steering connecting links are also represented in the position of maximum compression.

FIGS. 1 and 2 show that the front wheel 1 of the motorcycle is rendered integral with a wheel rod 2 which is carried by a single support arm 3 through the intermediary of bearings 4 and 5. The support arm 3 which presents transversely a cambered form laterally surrounding the peripheral part of the wheel 1 and of the tire 6 of this wheel is connected to a front peak 7 of the chassis of the motor cycle through the intermediary of a suspension and shock absorbing block 8 constituted by a shock absorbing body 9 with an external rod 10, surrounded by a suspension helical spring 11. External rod 10 is pivotally mounted on front peak 7 by two bearings 12 (which could be replaced in a less elaborate version by a silent block type elastomer connection) authorizing the variations of inclination of the support arm 3. The rod 10 is integral at one end and at the inside of the cylinder of the shock absorber body 9 with a shock absorber piston (not represented) and at its other end, with a sleeve 13 which carries the bearings 12 and on which rests through the intermediary of a lower friction stop or abutment member 14 (for example of the needle type) and of a cup 15, the upper end of the helical suspension spring 11. The shock absorber body 9 is fixed, by clamping its lower part by means of a flange 16 to the upper part of the support arm 3 and is surrounded by a bearing cup 17 of the lower end of the spring 11 which bears on the arm 3; this cup 17 may also comprise a lower friction abutment. In a conventional way, the support arm 3 carries a brake disk yoke 18 into which extends, in the zone of the brake linings 18a, a brake disk 19 integral with the wheel 1 and with the axle of the front wheel, this arm 3 being connected by a lower guiding arm 20 to the engine block of the motorcycle. For aesthetic reasons and for protection against external attacks, the suspension spring 11 can be housed completely inside the shock absorbing body 9, in the same way as in the conventional-construction of telescopic forks of motorcycles.

It is one particular object of the present invention especially to connect the handlebar with two arms 21 to the support arm 3, so as to enable this support arm 3 to rotate in synchronism with the handlebar 21 whatever the position of the rod 10 and the degree of compression of the front suspension spring 11 of the motorcycle. For this purpose the invention provides an upper link 22 pivotally connected at its upper end, at 23 by bearings 23a and 23b, to bosses 24a and 24b of a ring member 25 holding the right and left tubes of the handlebar 21. Ring member 25 is rotationally mounted by bearings 25a vertically on the peak 7. The link 22 has an upper fork with two legs 22a and 22b and a single bearing lower connection 26 crossed through by an assembly pin 27 and disposed between two bearings 28a, 28b of a lower link 29. The upper link 22 is inclined towards the front of the motorcycle from its upper end while the lower link 29 is fowardly inclined from its lower end which has two legs 29a and 29b, so that the scissor-wise articulation of these two links assumes a V-shape pointed towards the front of the motorcycle. The lower link 29 is pivotally connected by its two lower legs 29a and 29b, and by bearings 30a and 30b, respectively to bosses 31 and 32 provided on the support arm 3 substantially at the level of the flange 16.

FIG. 1 represents in mixed lines (the displaced elements being designated by a prime index) the position of the links 22 and 29 (referenced 22′ and 29′) when the suspension of the front wheel of the motorcycle is extended to a maximum, which corresponds to the representation of FIG. 1 while the full lines show the position of these links when said suspension is compressed to a maximum. It will be noted on FIG. 2 that the upper and lower links 22, 29 have substantially the same length and that the angle alpha formed by their respective median lines with the longitudinal axis 33 of the suspension block 8 in maximum extension position of this suspension block is about 30°, the obtuse angle beta of the V formed by the two links being about 120°. In the position of maximum compression of the front wheel suspension, in which the links 22 and 29 are represented by full lines on FIG. 2, the angle alpha is close to 60°, which is also the value of the sharp angle beta between the two links. The lower link 29 comprises at each end a fork with two legs but the two links 22 and 29 both present the general form of a trapezium the great base of which being pivotally connected respectively to the handlebar 21 (high link 11) and to the wheel support arm 3 (low link 29) and while the small bases are joined to each other in the zone crossed through by the assembly pin 27 and are pivotally (rotationally) connected to each other so as to allow to transmit torque from the handlebar 21 to the support arm 3 and the wheel 1.

The two-legged links 22 and 29 could be each replaced by two separated rods pivotally connected with respect to each other on a rod replacing the pin 27. It will be noted that the bearings interconnecting the upper end of link 22 and the lower end of link 29 are located beyond the bearing planes of the respective ends of the suspension spring 11. These bearing planes of the spring 11 are constituted by bearing 13 and cup 17 which can also be provided with a low friction abutment member. The handlebar 21 with two arms can also be constituted by a continuous handlebar gripped by a clamping piece in front or to the rear of the articulation or pivoting axis 23 of the upper link 22. This disposition allows to adapt the handlebar 21 to the morphology of the pilot of the motorcycle.

The operating mode of the steering control device that is explained herein-above with respect to FIGS. 1 and 2 is easy to understand. When the rider of the motorcycle turns the handlebar 21, the arms 22a and 22b of the upper link 22 are rotated by bosses 24a and 24b and will rotate pin 27 that crosses through the single bearing surface 26. Bearings 28a and 28b of the lower rod are rotated by the pin 27 and thus rotate by the same angle as the lower link 29 and the arm 3 that holds the axis 2 of the wheel 1 substantially in the steering controlled by the handlebar 21, the slight difference between the rotation of the handlebar 21 and that of the wheel 1 being mainly due to the flexional and/or torsional deformation of the links and to the "drag" reaction of the tire 6 on its running path 34. When the front suspension of the motorcycle is displaced by compression or extension of the spring 11, the links 22 and 29 turn scissor-like with respect to one another about the pivoting axis constituted by the pin 27 and their other rotative connections 23 and 30, thereby varying angles alpha and beta in opposite directions, without the transmission of the torque between the handlebar 21 and the support arm 3 being affected. It will also be noted that the higher the load applied by the front peak 7 of the chassis on the wheel 1, especially in the case of braking, the greater the trend of pin 27 tends to be move away from the wheel 1, which facilitates control by the handlebar 21 of the reactions issuing from the wheel 1, specifically at the moment that these reactions are maximal due to the transfer of the load onto the front wheel.

FIG. 3 illustrates an alternative version of the steering control device according to the invention, representing on a smaller scale the main elements of the motorcycle assembly. The pieces and parts identical to those of FIGS. 1 and 2 bear the same reference numerals and will not be explained again. Among the elements that have not yet been explained, are the motor-transmission block 35 and its front and rear support plates 36 and 37 respectively, connected to the front chassis of the motorcycle which carries the peak 7 with the reinforcing and connecting bars connected to the motor block 35, the upper exhaust pipes 40, the rear wheel 41 and its suspension arm 42 as well as the lower articulated connection of the guiding arm 20 connected to the lower part of the support arm 3 underneath the wheel rod 2 (also represented in cross-section in FIG. 2).

In the embodiment according to FIG. 3, handlebar 21 comprises a vertical tube 43 integral with the ring member 25 rotationally mounted in on the peak 7. The handlebar 21 can thus be placed in a position substantially higher than the upper end of the link 22, which allows to improve the position of the motorcycle rider, in particular in the case of touring motorcycles.

When the motorcycle represented in FIG. 3 runs on its running path 34, the rotation of the handlebar 21 causes the tube 43 to turn the ring member 25 so as to rotate links 22 and 29 through their respective articulations 23, 27 and 30 (cf. FIGS. 1 and 2) thus, consequently rotating the support arm 3 of wheel 1. Any compression of the suspension spring 11 causes the V-shaped structure formed by the links to narrow and thus reduces the angle beta formed between these two links without interrupting the connection transmitting the torques between the ring member 25 and the support arm 3 of the front wheel 1. It will be noted from FIG. 3 that links 22 and 29 do not impair the general aesthetics of the motorcycle and are totally independent from the suspension and shock absorber block 8 which can thus be selected so as to produce the best compromise between suspension and shock absorbing performances and availability and cost requirements.

According to the embodiment represented in FIG. 4, the front wheel 1 of the motorcycle is rotatably mounted on a wheel axle or spindle 2 which is carried by a single support arm 3 through the intermediary of bearings (not represented). The support arm 3 presents transversely a curved form laterally surrounding the peripheral portion of the wheel 1 and the tire 6 of this wheel and is connected to a front peak 7 of the motorcycle frame through the intermediary of a suspension and shock-absorber block 8, constituted by a shock-absorber body 9 with an external rod 10, surrounded by a helical suspension spring 11. The external rod 10 directed downwards is rotatively mounted to the upper part 3a of the arm 3 through a connecting axle 12, authorizing the relative variations of inclination of the support arm 3 of the rod 10. Inside the cylinder of the shock absorber body 9, the rod 10 is integral with a shock-absorber piston (not represented) and carries on its lower end a cup 15 upon which bears the lower end of the helical suspension spring 11. The shock-absorber body 9 is secured at its upper part by a suitable articulation, for example an elastomer silent block, to the peak 7 of the body. In a conventional manner, the support arm 3 carries at least one disk brake yoke 18 into which extends a brake disk 19 integral with both the wheel 1 and the shaft 2, and this arm 3 is connected by a lower guiding arm 20 and an upper guiding arm 44 to the front beam 38 of the motorcycle body.

The aim of this embodiment is to connect a steering control handlebar with two arms 21 to the support arm 3, so as to cause this support arm 3 to rotate in synchronism with the handlebar 21 whatever the position of the rod 10 and the compression of the front suspension spring 11 of the motorcycle. For this purpose an upper link is provided which is hinged at its upper end at 23 by two arms, to supports 25 of the right and left tubes of the handlebar 21 rotatively mounted on the peak 7. The link 22 carries on its lower portion a sphere-receiving socket 26 secured by screws 22a. The upper link 22 is inclined downwards from its articulation 23 and is hinged to a lower link 29 inclined upwards from its lower kinged connection 30 to the upper part 3a of the arm 3.

According to this embodiment, the connection between the upper and lower links 22, 29 is provided by a socket joint constituted by the socket 26 in which is confined a spherical ball 27 secured by an adjustable rod 27a to the upper end of the lower link 29. The articulation 26, 27 permitting a limited rotation in all directions, the scissor-like articulation of the two links 22 and 29 takes a V-shape pointed towards the front of the motorcycle. It will be noted that the lower link 29 is hinged by its two lower legs to the axle 30 which is placed in front of the central axle of the arm 3, which axle defines the orientation axis 33 of the front wheel. The axle 12 connecting the piston rod 10 to the upper part 3a of the arm 3 is placed substantially at the level of the axle 30 but beside the front beam 38 of the motorcycle frame, with respect to the orientation axis 33.

FIG. 4 represents in dash-dot lines (the displaced elements being designated by a prime index) the position assumed by the links 22 and 29, (indicated at 22' and 29') when the suspension front wheel of the motorcycle is in the position of maximum compression, and shows in full lines the position of these links when this suspension is extended to a maximum. It will be noted in this FIG. 4 that the upper link 22 is longer than the lower link and that said link 22 is placed, in the position of maximum compression or crushing of the suspension, adjacent to the horizontal position, i.e. perpendicular to the axle 33, which means that it then assumes the position of a longer lever arm transmitting the maximum torque to the arm 3 at the very moment when the load on the wheel and the torques to be overcome in order to steer the wheel are at a maximum. The drawing also shows in dash-dot lines the position of a cover 45 surrounding the links 22 and 29 of which the position defining their maximum space requirement in width corresponds to the case where the link 29 is substantially perpendicular to the axle 33. The fact that the lower link 29 is shorter than the upper link 22 contributes to reducing the space required for the two links and thus that required for the cover 45.

The operating mode of the steering control device which has been described herein-above with reference to FIG. 4 is quite simple. When the motorcycle pilot turns the handlebar 21, the upper link 22 turns, driven rotatively by the supports 25 and causes to turn the spherical ball 27 that drives in rotation the upper link 29 and the arm 3 which positions the axle 2 of the wheel 1 substantially in the direction determined by the handlebar 21.

In the case of displacement of the front suspension of the motorcycle by compression or extension of the spring 11, the links 22 and 29 turn with respect to each other in a scissor-like movement about the ball-and-socket joint 26, 27 and about their end articulations 23 and 30, thus causing the angle alpha between the two links to vary, without the transmission of the torque between the handlebar 21 and the support arm 3 being affected.

Due to the rotation of the steering arms 20 and 44, the inclination of the orientation axis 33 varies slightly during displacement of the suspension. The hinging axle 30 of the lower link 29 being placed in front of the orientation axis 33, after a significant rotation of the arm 3a about this axis 33, the axle 30 no longer strictly centered on the axle 23. The relative shift of the axles 23 and 30 would thus result in jamming the articulation common to the upper and lower links 29 if this articulation were not constituted by the ball-and-socket joint 26, 27. A slight bending of the ends of the links 22 and 29 allows the center of the ball-and-socket joint 26, 27 to be off-centered slightly with respect to the upper and lower articulation axles 23, 30 while maintaining a perfect mobility of the scissor-like articulation between the two links 22 and 29.

It is well understood that the present invention is in no way limited to the embodiments described and represented herein-above and it can be adapted to numerous variants available to those skilled in the art without departing from the scope and spirit of the invention.

I claim:

1. A front suspension device for a motorcycle having a body, two wheels, and a steering control system, comprising:
   a lateral arm for supporting a wheel of the motorcycle and for steering the wheel about a steering axis;
   a first link having a first end articulated with a lower part of said lateral arm and a second opposite end connected to the body of the motorcycle;
   a suspension system having a first end connected with an upper part of said lateral arm and a second opposite end connected to the body of the motorcycle, said suspension system including a shock absorber and a spring;
   guiding means for guiding said lateral arm so that said steering axis is always maintained in the same longitudinal steering plane which is the median plane of the wheel;
   steering transmission means separate from and independent of said suspension system and connected between said lateral arm and the steering control system for controlling steering of the wheel by said lateral arm in response to the steering control system.

2. A front suspension device according to claim 1; wherein said steering transmission means includes upper and lower steering links articulated scissor-wise with each other, the upper steering link having an upper end rotatably connected to said steering control system and the lowest steering link rotatably connected to said lateral arm, with rotation axii of said upper and lower steering links being substantially perpendicular to said longitudinal steering plane.

3. A front suspension device according to claim 2; wherein said guiding means is formed by said lateral arm being fixedly connected with one portion of said shock absorber.

4. A front suspension device according to claim 2; wherein said guiding means includes a second link having one end articulated with an upper part of said lateral arm and an opposite end rotatably connected to the body of the motorcycle.

5. A front suspension device according to claim 2; further including ball and socket means for articulating the upper and lower steering links with each other.

6. A front suspension device according to claim 2; wherein the upper and lower steering links provide a general form of a trapezium having a large base pivotally connected to the steering control system and to the lateral support arm of the wheel, and the remaining smaller bases are pivotally connected to each other.

7. A front suspension device for a motorcycle having a body, two wheels and a steering control system, comprising:
   (a) a lateral arm for supporting a wheel of the motorcycle;
   (b) a suspension system connected to an upper end of said lateral arm, said suspension system including a shock absorbing block having an external movable rod pivotally connected at a free end thereof to the body of the motorcycle and rotatably mounted about an axis substantially perpendicular to a steering plane of the wheel, and a helical spring which applies a biasing force to the movable rod;
   (c) steering means for controlling said lateral arm;
   (d) an upper steering link inclined downwardly towards the front of the motorcycle, said upper steering link having an upper end pivotally connected to said steering means and a lower end pivotally connected about an axis substantially perpendicular to said steering plane;
   (e) a lower steering link inclined upwardly towards the front of the motorcycle and having a lower end pivotally connected to said lateral arm about an axis substantially perpendicular to the steering plane, and an upper end pivotally connected to the lower end of the upper steering link so the upper and lower steering links are pivotally connected together in a scissor-wise manner; and
   (f) the upper end of the upper steering link and the lower end of the lower steering link being located beyond bearing planes of the helical spring.

8. A front suspension device according to claim 7; wherein said upper steering link is pivotally connected to said steering means at a pivoting axis which is substantially coaxial with the pivoting axis of the external movable rod connected to the body of the motorcycle.

9. A front suspension device according to claim 7; wherein said steering means includes handlebars having two handlebar arms and a boss connected to each handlebar arm; the upper steering link includes a fork with two legs, each of which is rotatably connected to a boss of one said handlebar arm; said lower steering link includes a fork having two legs, each rotatably connected at lower ends thereof to a corresponding boss on said lateral arm and having an upper end with two bearings in spaced relation thereon; and further including a central bearing having an assembling pin extending therethrough disposed between the two bearings at the upper ends of the legs of the fork of the lower steering link for rotatably connecting lower ends of the two legs of the fork of the upper steering link thereto.

10. A front suspension device according to claim 7; wherein a low friction abutment is positioned at at least one of the bearing planes at the ends of the helical spring for permitting free rotation of the spring about its longitudinal axis during displacement thereof.

11. A front suspension device according to claim 7; wherein said lower steering link has a length shorter than that of said upper steering link and is adapted to be positioned substantially perpendicular to the steering axis of the lateral arm under maximum compression conditions of said suspension system.

* * * * *